US005528084A

United States Patent [19]

Shiga et al.

[11] Patent Number: 5,528,084

[45] Date of Patent: Jun. 18, 1996

[54] STARTER HAVING ENHANCED HEAT DISSIPATION

[75] Inventors: Tsutomu Shiga, Nukata-gun; Nobuyuki Hayashi, Nagoya; Masanori Ohmi, Anjo; Masami Niimi, Handa, all of Japan

[73] Assignee: Nippondenso Co., Ltd., Kariya, Japan

[21] Appl. No.: 381,405

[22] Filed: Jan. 31, 1995

[30] Foreign Application Priority Data

Oct. 5, 1994 [JP] Japan .................................. 6-241142

[51] Int. Cl.[6] .............................. F02N 11/00; H02P 9/04

[52] U.S. Cl. .......................................... 290/38 R; 290/48

[58] Field of Search .............................. 290/38 R, 38 A, 290/38 B, 38 C, 38 D, 38 E, 48; 310/239

[56] References Cited

U.S. PATENT DOCUMENTS

| | | | |
|---|---|---|---|
| 3,030,518 | 4/1962 | Jensen | 290/36 R |
| 5,059,813 | 10/1991 | Shiroyama | 290/48 |
| 5,148,072 | 9/1992 | Shiroyama | 310/239 |
| 5,159,908 | 11/1992 | Eyermann et al. | 123/179.1 |
| 5,196,727 | 3/1993 | Isozumi et al. | 290/48 |
| 5,252,878 | 10/1993 | Spellman et al. | 310/239 |

FOREIGN PATENT DOCUMENTS 61-105761 7/1986 Japan .

*Primary Examiner*—Steven L. Stephan
*Assistant Examiner*—Christopher Cuneo
*Attorney, Agent, or Firm*—Cushman, Darby & Cushman

[57] ABSTRACT

A starter that can improve heat radiation efficiency and improve the brush life. An upper movable contact is set on the end of a plunger shaft fixed on a plunger. The upper movable contact moves together with the plunger due to the attraction force of an attraction coil and contacts a fixed contact set to face the upper movable contact and which is connected to a terminal bolt. The upper movable contact is directly installed and integrated with a brush, so the heat generated by the bush is efficiently dissipated through the brush, upper movable contact, fixed contact and terminal bolt out the battery cable connected to the terminal bolt.

11 Claims, 5 Drawing Sheets

STARTER HAVING ENHANCED HEAT DISSIPATION

CROSS REFERENCE TO RELATED APPLICATION

This application is based upon and claims priority of Japanese Patent application No. 6-241142 filed Oct. 5, 1994, the content of which is incorporated herein by reference.

BACKGROUND OF THE INVENTION

1. Field of the Invention

The present invention generally relates to a starter used for starting an internal combustion engine.

2. Related Art

According to the Japanese Patent Laid-open Publication No. 61-105761, a movable contact that directly contacts a fixed contact fixed in an end frame that covers one end of a motor chassis is set in the motor chassis. A copper strand wire is wound on one end of the movable contact with a nut, and the other end of the copper strand wire is directly connected to the input end portion of a field coil together with the output side lead wire of a solenoid coil.

Furthermore, an attraction coil that attracts when energized, and a plunger set on the inner circumference of this attraction coil are set in the switch. A rod is connected to one end of this plunger, and a shift lever to slide an overrunning clutch is connected to the other end. A lever is fixed to the rear end of the rod with a snap ring, and this lever is inserted into the motor chassis. A movable contact is wound onto the insertion end portion with a nut. Furthermore, the lever is covered with a rubber cover.

In such a starter, when the attraction coil is energized, the plunger is attracted by the electromotive force of the attraction coil and the movable contact fixed to the lever moves with the plunger to contact the fixed contact fixed on the end frame. Thus the battery voltage is then applied on the field coil via the copper strand wire connected to the movable contact, the armature is energized via the brush and commutator thereby drives the starter.

However, when the engine is started with the conventional starter, a large current flows to the armature causing the starter to rapidly heat up. The heat generated on the portion where the commutator and brush contact becomes the highest. The heat is dissipated through the brush, field coil, copper strand wire, movable contact, fixed contact to the battery cable, and thus, the dissipation path is extremely large. Furthermore as there is the field coil that acts as the field magnetic pole in the dissipation path, the brush is not sufficiently cooled, and may cause the brush life to drop.

SUMMARY OF THE INVENTION

It is therefore an object of the present invention to provide a starter that can increase the heat dissipation efficiency and improve the brush life.

According to the present invention, a magnet switch includes an attraction coil, plunger having a plunger shaft, and a movable contact set on one end of this plunger. This movable contact moves together with the plunger due to electromotive force of the attraction coil, and contacts a fixed contact connected with a battery and set to face the movable contact. A brush connection portion is directly connected with the movable contact so the heat generated at the brush when the motor rotates is efficiently dissipated from a battery cable via the brush, brush connection portion, movable contact and fixed contact thereby improving the life of the brush.

Preferably, a permanent magnet is set as the field magnetic pole in a motor yoke. After the contact of the movable contact and fixed contact is released, a positive pole brush and a negative pole brush are short circuited, and an electromotive force is generated in an armature coil by the permanent magnet's magnetic force when the motor coasts and rotates. A braking force is then applied on the motor's coasting rotation thereby reducing the motor stopping time. Therefore, even if the starting of the internal combustion engine fails, the starter can be re-started immediately, and the impact when the ring gear and pinion gear teengage can be eased.

Further, preferably the brush is set near the movable contact so the brush connection portion in the heat dissipation path can be shortened, and the heat is efficiently dissipated from the battery cable thereby improving the brush life.

Still further preferably the attraction coil, plunger, plunger shaft, movable contact and fixed contact connected with the end frame are set in the end frame, so the rod connected to the plunger and the lever connected to the rear of this rod with a snap ring can be eliminated, thereby reducing the number of parts. This also allows the distance between the brush and movable contact to be shortened, and prevents a conductivity defect between the brush and movable contact due to vibration from the engine.

With a starter having a reduction mechanism for speed reduction and conveying the armature shaft rotation to an output shaft having a pinion gear that engages with ring gear of the internal combustion engine, the torque generated by the engine is reduced by the amount that the output rotation speed can be reduced, and a high speed compact motor can be used. On the other hand, however, the heat capacity is small so the heat generated between the commutator and brush contact portion during motor rotation must be resolved. In accordance with the invention, the brush heat can be efficiency dissipated from the battery cable as explained above and, thus, the effect is extremely large for a starter with reduction mechanism or in other words, a starter in which the motor rotates at a high speed.

In accordance with the invention, engagement means are provided to engage the pinion gear to the ring gear in the internal combustion engine by sliding the pinion gears set on the output shaft with the attraction of the plunger, thereby allowing a favorable engagement to be realized.

DETAILED DESCRIPTION OF THE PREFERRED EMBODIMENT

Figure 1:
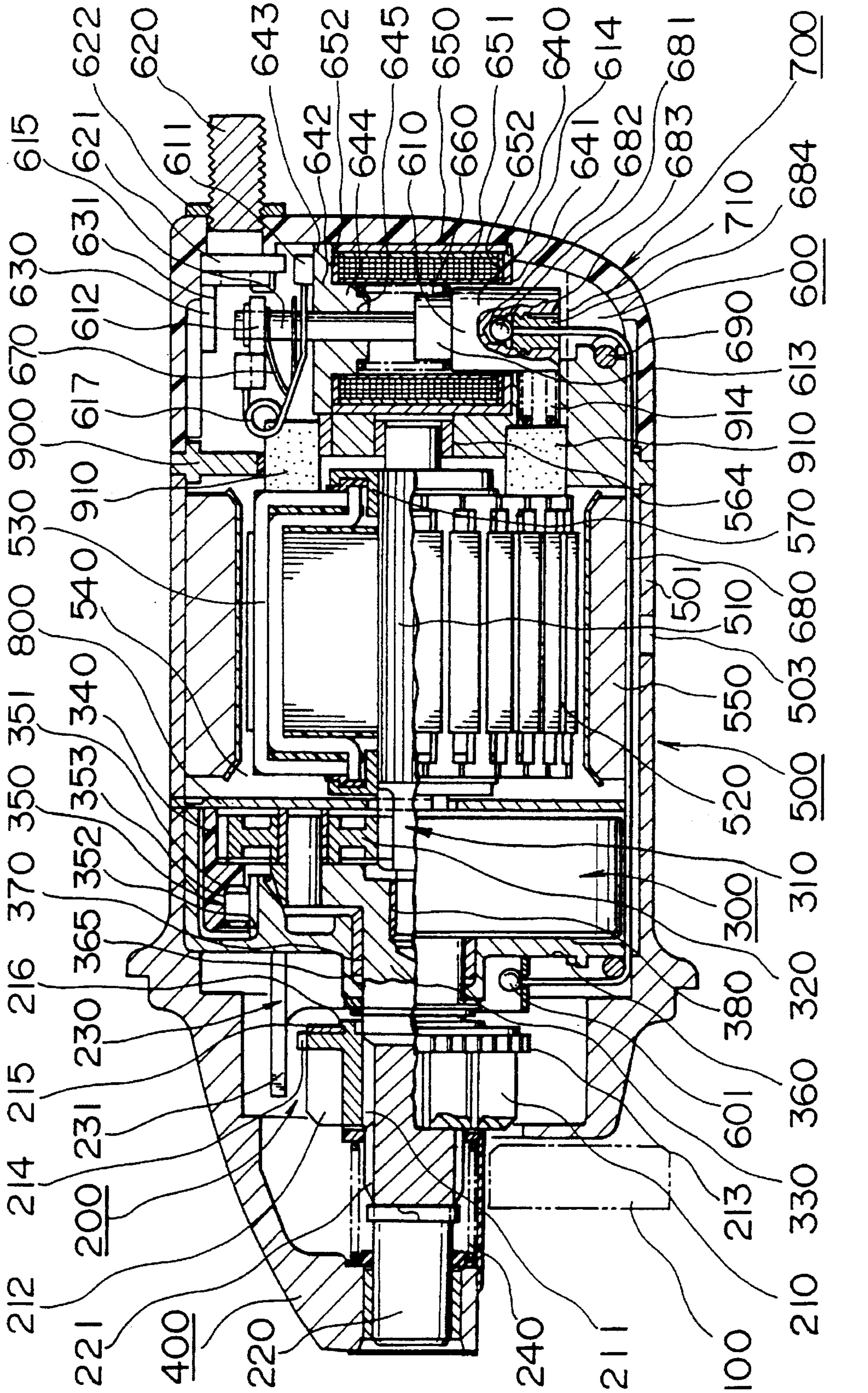
FIG. 1 is a cross-sectional view illustrating an embodiment of a starter according to the present invention.

The embodiment of a starter according to the present invention will be described with reference to FIG. 1 through FIG. 7.

The starter is largely comprised of a pinion 200 that engages with a ring gear 100 of the engine, a housing 400 that covers an epicycle gear reduction mechanism 300, a starter motor 500, and an end frame 700 that covers a magnet switch 600. Inside the starter, the housing 400 and motor 500 are separated by a motor wall 800, and the motor 500 and end frame 700 are separated by the brush holding member 900.

[Pinion 200]

As shown in FIG. 1, a pinion gear 210 that engages with an engine ring gear 100 is formed on pinion 200. A pinion helical spline 211 that fits with a helical spline 221 formed on an output shaft 220 is formed on the inner circumference of the pinion gear 210.

A flange 213 of which outer diameter dimension is larger than that of the pinion gear 210 is formed in a ring-shape on the pinion gear 210. Notches 214 of which the number is larger than that of outer teeth of pinion gear 210 are formed on the outer circumference of the flange 213. These notches 214 fit with the restriction claw 231 on a later-described pinion rotation restriction member 230. A washer 215 can freely rotate and does not fall out in the axial direction at the rear of the flange 213 as the round ring portion 216 formed on the rear end of the pinion gear 210 is bent toward the outer circumference.

By setting the washer 215 that can freely rotate on the rear side of the flange 213 of the pinion gear 210, if the pinion rotation restriction member 230 described later falls behind the pinion gear 210, the front end of the restriction claw 231 of the pinion rotation restriction member 230 will contact the washer 215. Therefore, the rotation of the pinion gear 210 does not directly contact the restriction claw 231 of the pinion rotation restriction member 230, and the washer 215 relatively rotates to prevent the pinion gear 210 from being worn by the restriction claw 231 of the pinion rotation restriction member 230.

[Epicycle Gear Reduction Mechanism]

The epicycle gear reduction mechanism 300 shown in FIG. 1 is a speed reduction or deceleration means that decelerates the rotation of the motor 500 explained later and increases the motor 500 output torque. The epicycle gear reduction mechanism 300 is composed of a sun gear 310 formed on the front outer circumference of an armature shaft 510 of the motor 500 (explained later), multiple planetary gears 320 that are engaged with the sun gear 310 and that rotate around the sun gear 310, the planet carrier 330 that rotatably supports the planetary gears 320 around the sun gear 310 and that is integrated with the output shaft 220, and a tubular resin internal gear 340 that are engaged with the planetary gears 320 on the circumference of the planetary gears 320.

An overrunning clutch 350 rotatably supports the internal gear 340 in one direction (only in direction rotatable with engine rotation). The overrunning clutch 350 is composed of a clutch outer 351 that acts as the first cylindrical portion integrated with the front side of the internal gear 340, a ring-shaped clutch inner 352 that acts as the second cylindrical portion arranged to oppose the inner circumference of the clutch outer 351 and that is formed on the rear surface of the center bracket 360 that acts as the fixing side that covers the front side of the epicycle gear mechanism 300, and rollers 353 stored in the roller storage portion formed at an inclination to the inner circumference surface of the clutch outer 351.

Motor 500

The motor 500 is enclosed by a yoke 501 having a hole, motor wall 800 and the brush holding member 900.

As shown in FIG. 1, the motor 500 is composed of an armature shaft 510, an armature 540 fixed to this armature shaft 510 and composed of an armature core 520 and armature coil 530 that integrally rotate, and fixed magnetic pole 550 that rotates the armature 540. The fixed magnetic pole 550 is fixed to the inner circumference of the yoke 501.

Armature Shaft 510

The armature shaft 510 is rotatably supported by the planet carrier bearings 380 on the inner rear of the planet carrier 330 of the epicycle gear reduction mechanism 300 and a brush holding member bearing 564 fixed on the inner circumference of the brush holding member 900. The front end of this armature shaft 510 is inserted through the inner side of the epicycle gear reduction mechanism 300, and as mentioned above the sun gear 310 of the epicycle gear reduction mechanism 300 is formed on the outer circumference of the forward end of the armature shaft 510. The output shaft 220 that has the pinion gear 210 thereon is arranged coaxially with this armature shaft 510.

Armature Coil 530

Figure 2:
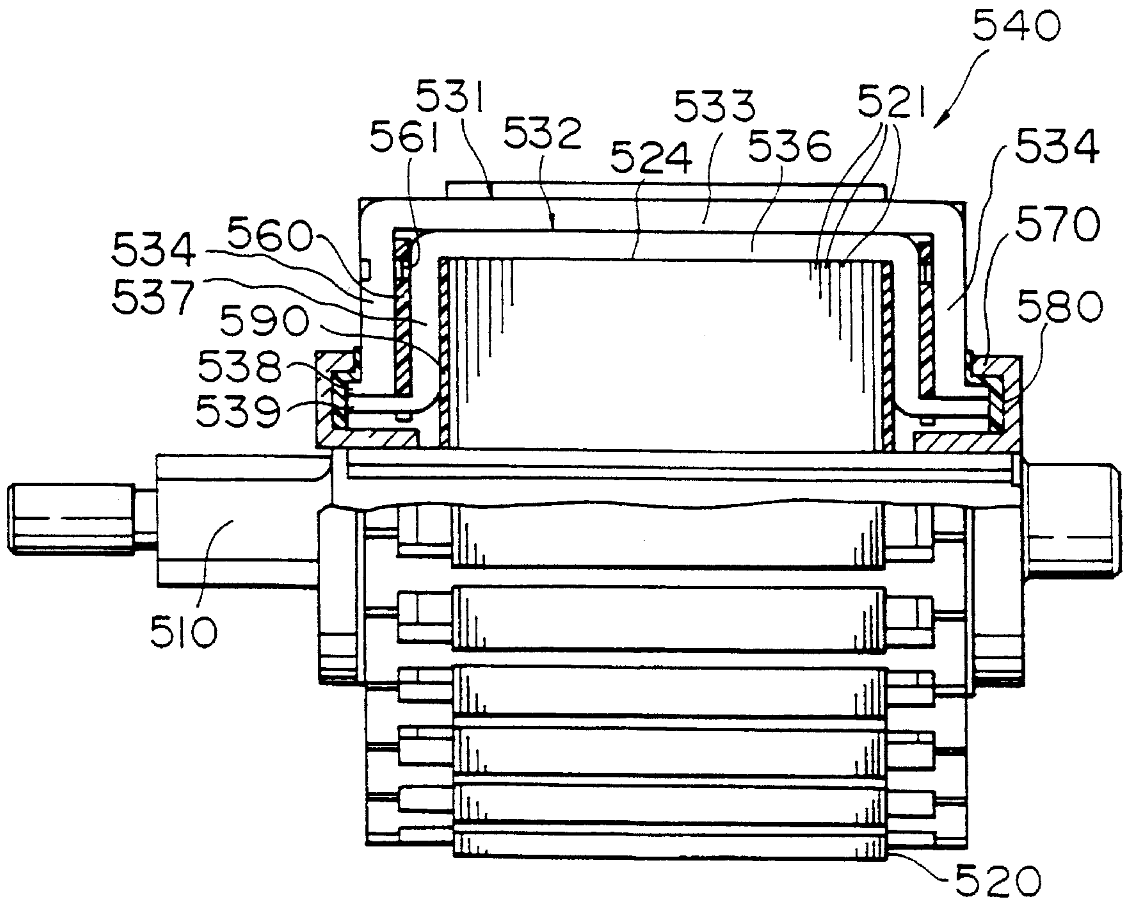
FIG. 2 is a side cross-sectional view illustrating an armature of the embodiment.

In this embodiment, as shown in detail in FIG. 2, multiple (for example 25) upper coil bars 531 and the same number of lower coil bars 532 are used for the armature coil 530. Each of the upper coil bars 531 and lower coil bars 532 are radially piled to form two layer winding coils. Each upper coil bar 531 and each lower coil bar 532 is operatively combined, and the ends of each upper coil bar 531 and each lower coil bar 532 are electrically connected to form a ring-shaped coil.

Upper Coil Bar 531

The upper coil bar 531 is composed of a material such as copper having an outstanding conductivity and has the upper coil piece 533 that is held in the outer circumference of a slot 524 extending axially through stack of metal sheets 521, and that extends in parallel to the fixed magnetic pole 550, and has two upper coil ends 534 that are bent inward from both ends of the upper coil piece 533 and that extend perpendicularly in the axial direction of the armature shaft 510. The upper coil piece 533 and the two upper coil ends 534 can be integrally shaped with cold forging, bent and formed in a U-shape with a press, or can be separately formed upper coil piece 533 and two upper coil ends 534 that are connected with welding.

The upper coil ends 534 also act as a commutator that directly contacts brushes 910 as described later.

Lower Coil Bar 532

As with the upper coil bar 531, the lower coil bar 532 has a lower coil piece 536 composed of a material such as copper having an outstanding conductivity that is held in the outer circumference of the slot 524 and that extends in parallel to the fixed magnetic pole 550, and has two lower coil ends 537 that are bent inward from both axial ends of the lower coil piece 536 and that extend perpendicularly in the axial direction of the shaft 510. The lower coil piece 536 and the two lower coil ends 537 can be integrally cold cast, bent and formed in a U-shape with a press, or can be separately formed lower coil piece 536 and two lower coil ends 537 that are connected with welding, etc., as with the upper coil bar 531.

The insulation of each upper coil end 534 and each lower coil end 537 is ensured with an insulation spacer 560. The insulation between each lower coil end 537 and the armature core 520 is ensured with a resin (e.g., nylon or phenol resin) insulation ring 590.

An upper inner extension portion 538 that extends axially is created on the inner circumference ends of the two upper coil ends 534. The lower inner extension portion 539 on the inner end of the lower coil bar 532 explained above is layered with the inner circumference of this upper inner extension portion 538. These are electrically and mechanically connected with connection technology such as welding. The outer circumference of the upper inner extension portion 538 contacts the inner surface of the outer circumference ring portion of a fixing member 570 press-fixed onto the armature shaft 510 via an insulation cap 580.

Yoke 501

Figure 3:
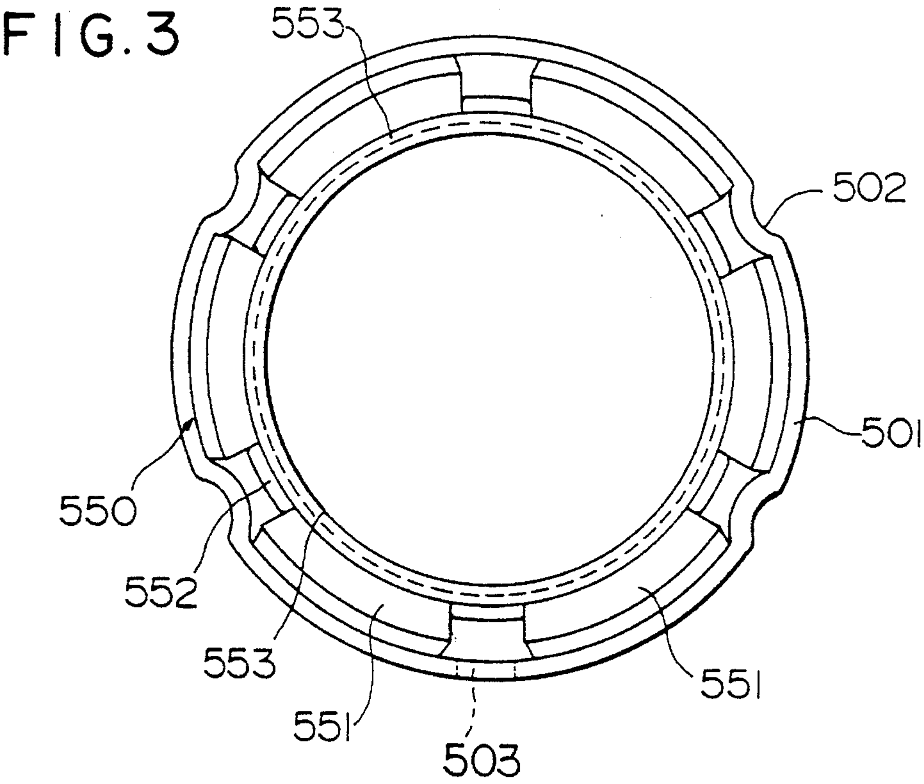
FIG. 3 is a front side view of a yoke of the embodiment.
Figure 4:
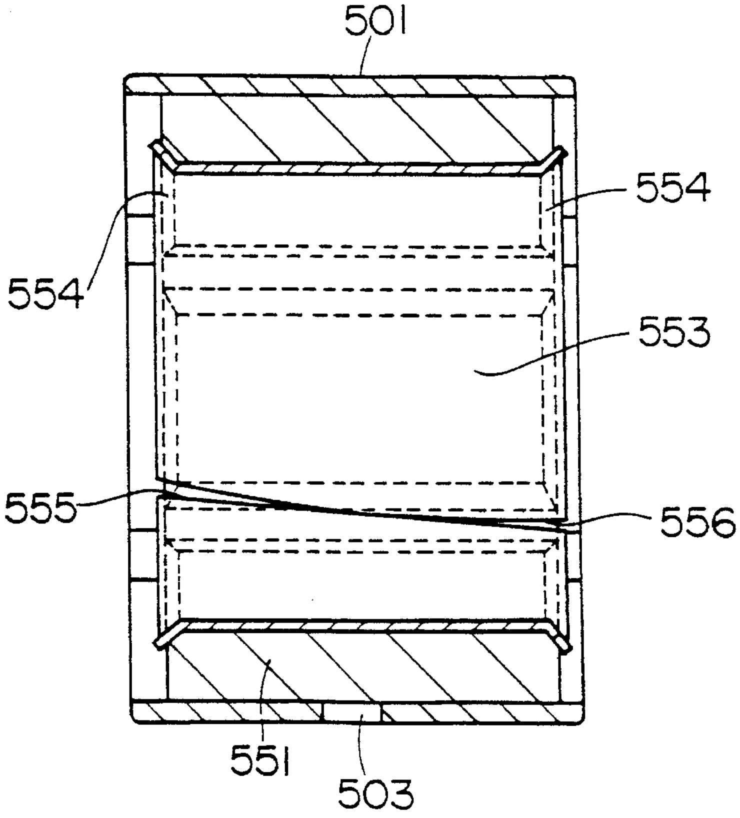
FIG. 4 is a cross-sectional view illustrating the yoke shown in FIG. 3.

As shown in FIGS. 3 and 4, the yoke 501 is a cylindrical body formed by rounding a steel plate. Multiple concave grooves 502 that extend axially and face the inner circumference are formed on the circumference. These concave grooves 502 are used to arrange the through bolts and also to position the fixed magnetic poles 550 within the inner circumference of the yoke 501.

Fixed Magnetic Pole 550

In this embodiment, the fixed magnetic pole 550 is configured of multiple (e.g., six) main magnetic poles 551 as shown in FIG. 3, and the inter-pole magnetic poles 552 arranged between the main magnetic poles 551. Field coils that generate a magnetic force electrically can be used for fixed magnetic pole 550 instead of the permanent magnets.

The main magnetic poles 551 are positioned by both ends of the inner side of the concave grooves 502 on the yoke 501 described above. These are fixed to the inside of the yoke 501 by the fixing sleeve 553 arranged on the inner circumference of the fixed magnetic pole 550, with the inter-pole magnetic poles 552 arranged between the main magnetic poles 551.

The fixing sleeve 553 is a nonmagnetic (e.g., aluminum) sheet that has been round-machined from a band-like metal. Both ends 554 in the axial direction are bent to face the outer diameter, and to prevent the fixed magnetic poles 550 from deviating in the axial direction of the yoke 501. As shown in FIG. 4, the fixing sleeve 553 has two end pieces 555 and 556 (first end portion and second end portion) butted inside the fixed magnetic pole 550. The end piece 555 is set to be linearly inclined to the axial direction, and the other end piece 556 is set to gradually curve and incline to the axial direction. By setting one end piece 555 linearly and the other end piece 556 at a curve, even if a slight error occurs in the inner dimensions of the fixed magnetic pole 550, the fixing sleeve 553 can be enlarged to the outer diameter side by axially moving or deviating the butt position of the one end piece 555 and other end piece 556 to absorb this error. As a result, the diameter dimensions of the fixing sleeve 553 are fixed, so the fixed magnetic pole 550 are firmly held between the fixing sleeve 553 and yoke 501.

Magnet Switch 600

Figure 5:
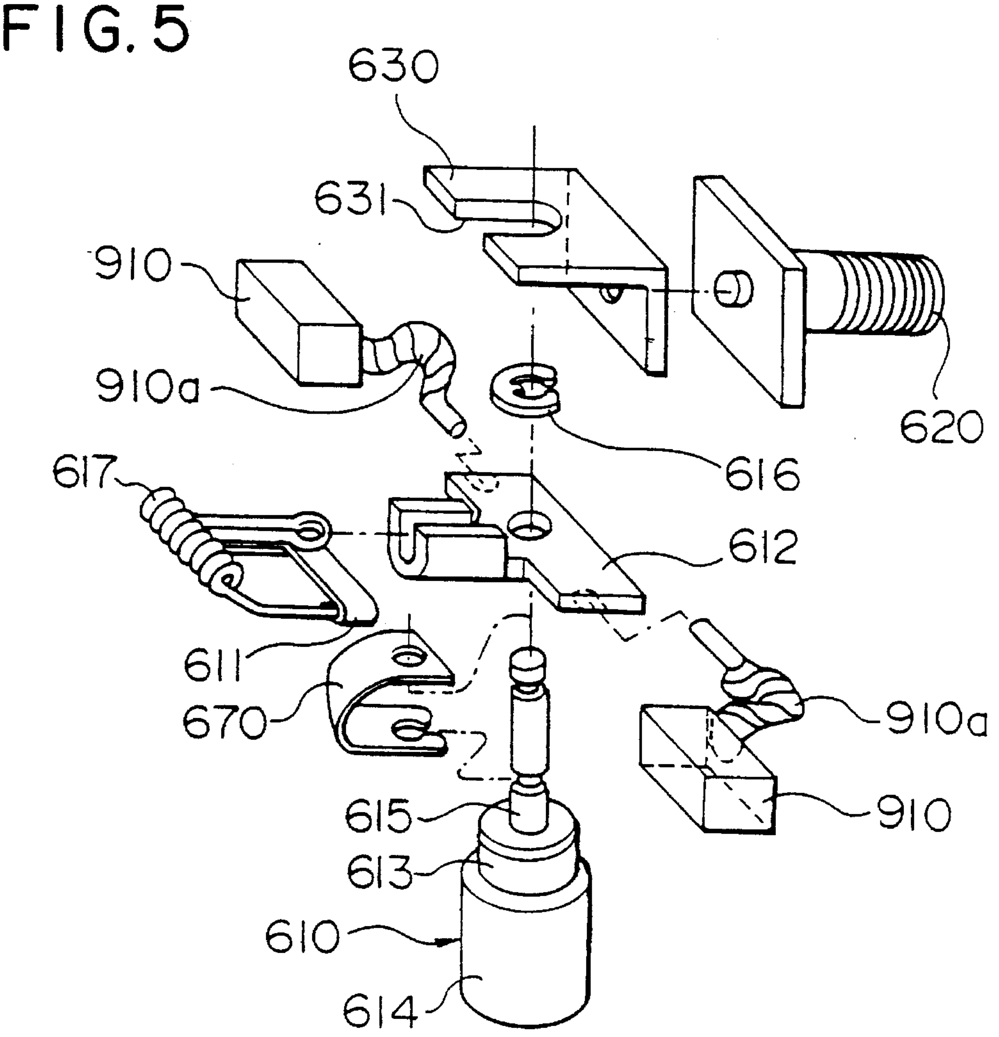
FIG. 5 is a breakdown perspective view illustrating a magnet switch of the embodiment.
Figure 6:
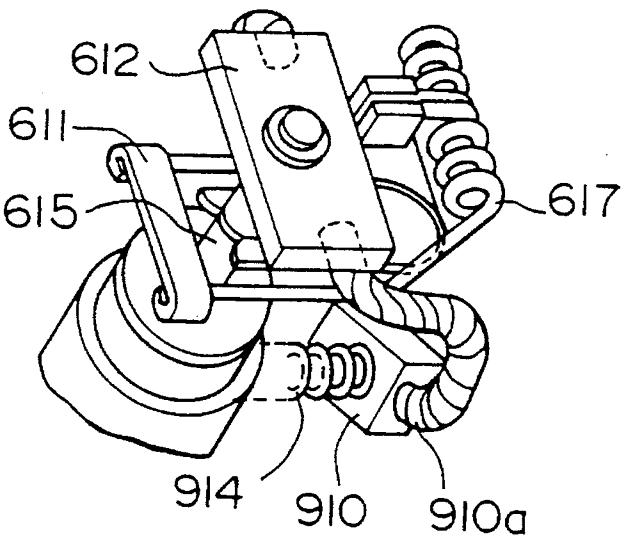
FIG. 6 is a perspective view illustrating the magnet switch shown in FIG. 5.

As shown in FIGS. 1, 5 and 6, the magnet switch 600 is held by the brush holding member 900 and is arranged in the end frame 700 explained later. The magnet switch 600 is fixed to be approximately perpendicular to the armature shaft 510.

With electrical conductivity, the magnet switch 600 drives a plunger 610 upward, with two contacts (lower movable contact 611 and upper movable contact 612) that move integrally with the plunger 610 to sequentially contact with a head 621 of a terminal bolt 620 and a contact portion 631 of a fixed contact 630. A battery cable not illustrated is connected to the terminal bolt 620.

The magnet switch 600 is configured inside the magnet switch cover 640 that is a magnetic (e.g., iron) tube with base. The magnet switch cover 640 is formed by pressing a mild steep plate into a cup shape for example, and has a hole 641 at the center of the base for passing the plunger 610 freely in the vertical direction. The upper opening of the magnet switch cover 640 is plugged by a magnetic (e.g., iron) stationary core 642.

The stationary core 642 is configured of the upper large diameter portion 643, lower middle diameter portion 644 and lower small diameter portion 645. The outer circumference of the larger diameter portion 643 tightens the upper end of the magnet switch cover 640 to the inner side so that the stationary core 642 is fixed in the upper opening of the magnetic switch cover 640. The upper end of attraction coil 650 is mounted to the periphery of the middle diameter portion 644. The upper end of a compressed coil spring 660 that energizes or biases the plunger 610 downward is mounted onto the outer circumference of the small diameter portion 645 of the stationary core 642.

The attraction coil 650 is an attraction means for pulling the plunger 610 closer, and is magnetized when power is passed through it. The upper end of the attraction coil 650 is mounted on the middle diameter portion 644 of the stationary core 642, and has a sleeve 651 that slides and freely covers the plunger 610 in the vertical direction. This sleeve 651 is made by round-machining a nonmagnetic (e.g., copper, brass, stainless steel) thin plate, and insulation washers 652 made of resin, etc., are set on the upper and lower ends of this sleeve 651. An insulating film (not illustrated) made of thin resin (e.g., cellophane, nylon film) or paper is wound around the periphery of the sleeve 651 between the two insulation washers 652. Furthermore, a fine enamel wire is wound a designated number of times around the periphery of the insulating film to configure the attraction coil 650.

Plunger 610 is made of a magnetic metal (e.g., iron), and has a column-shape that has an upper small diameter portion 613 and lower large diameter portion 614. The lower end of the compression coil spring 660 is mounted to the small diameter portion 613, and the large diameter portion 614 with relatively long axial direction is held so that it can move vertically inside the sleeve 651. A plunger shaft 615 that extends upward over the plunger 610 is fixed on the upper side of the plunger 610. This plunger shaft 615 protrudes upward from the through hole on the center of the stationary core 642. The upper movable contact 612 that slides freely through the vertical direction along the plunger shaft 615 is located on the upper side of the plunger shaft 615. This upper movable contact 612 is restricted from moving over the upper end of the plunger shaft 615 by a fixing ring 616 installed on the upper end of the plunger shaft 615 as shown in FIG. 5. As a result, the upper movable contact 612 slides freely in the vertical direction along plunger shaft 615 between the fixing ring 616 and stationary core 642. The upper movable contact 612 is constantly energized upward by the contact pressure spring 670 formed by the plate spring installed on the plunger shaft 615.

The upper movable contact 612 is composed of a metal such as copper having an outstanding conductivity. When both ends of the upper movable contact 612 move upward, the two contact portions 631 on the fixed contact 630 are contacted. Each lead wire 910*a* for the pair of brushes 910 is electrically and mechanically connected with caulking or welding to the upper movable contact 612. The ends of resistors 617 that act as multiple restriction means (two in this embodiment) are inserted and electrically and mechanically fixed to the grooves on the upper movable contact 612.

Each lead wire 910*a* for the pair of brushes 910 is electrically and mechanically connected with caulking or welding to the upper movable contact 612, however, the upper movable contact 612 and each lead wire 910*a* of the brush 910 can be integrally formed.

The resistor 617 is used to slow the motor rotation when the starter initially starts. Metal wires with a large resistance value are wound to configure the resistor 617. The lower movable contact 611 located below the head portion 621 of the terminal bolt 620 is fixed with caulking, etc., to the other end of the resistor 617.

The lower movable contact 611 is composed of a metal such as copper having an outstanding conductivity. This contacts the upper surface of the stationary core 642 when the magnet switch 600 stops and the plunger 610 is at the lower position. When the resistor 617 moves upward with the movement of the plunger shaft 615, the lower movable contact 611 will contact the head portion 621 of the terminal bolt 620 before the upper movable contact 612 contacts the contact portion 631 of the fixed contact 630 electrically connected to the head 621.

The concave portion of hole 682 is formed on the bottom side of the plunger 610 to store a spherical body 681 set on the rear end of a string-shaped member 680 (e.g., wire). A male screw 683 is formed on the inner wall of this concave portion 682, and a fixing screw 684 that fixes the spherical body 681 is screwed into this male screw 683. The length of the string-shaped member 680 is adjusted by adjusting the amount that the fixing screw 684 is screwed into the male screw 683. The length of the string-shaped member 680 is adjusted so that when the plunger shaft 615 moves upward and the lower movable contact 611 contacts the terminal bolt 620, the restricting claw 231 of the pinion rotation restricting member 230 fit into one of the notches 214 on the outer circumference of the pinion gear 210. The male screw 683 and fixing screw 683 act as adjustment mechanisms.

End Frame 700

As shown in FIG. 1, the end frame 700 is a magnet switch cover made of resin such as phenol resin. The magnet switch 600 is stored inside the frame.

A spring holding pole 710 that holds a compressed coil spring 914 that energizes or biases the brush 910 toward the front is installed on the rear side of the end frame 700 to protrude forward according to the brush 910 position. The compressed coil spring 914 is arranged on the outer circumference of the magnet switch 600 so that it is within the radial dimension of the magnet switch 600 in the axial direction of the motor 500 on the fixed side of the magnet switch 600 of the brush holding member 900.

The terminal bolt 620 is an iron bolt inserted from inside the end frame 700 to project from the rear of the end frame 700, and has a head portion 621 on the front that contacts the inner surface of the end frame 700. The terminal bolt 620 is fixed to the end frame 700 by installing a caulking washer 622 on the terminal bolt 620 projecting from the rear of the end frame 700. A copper fixed contact 630 is caulked and fixed onto the front end of the terminal bolt 620. This fixed contact 630 has one or multiple (six in this embodiment) contact portions 631 positioned on the inner upper end of the end frame 700. The upper surface of the upper movable contact that moves vertically with the magnet switch 600 is set to contact on the lower surface of these contact portions 631.

Brush Holding Member 900

The brush holding member 900 separates the inner side of the yoke 501 and inner side of the end frame 700 and functions to rotatably support the end of the armature shaft 510 via the brush holder bearing 564. In addition, the brush holding member 900 can act as the brush holder, can support the magnet switch 500, and can hold the pulley that guides the string-shaped member 680. The brush holding member 900 has a hole not illustrated through which the string-shaped member 680 is passed. The upper brush 910 is insulated from the brush holding member 900, while the lower brush 910 is grounded through the brush holding member 900. Such arrangement is disclosed in Tamemoto et al U.S. application No. 354100, filed Nov. 21, 1994 and assigned to the same assignee. The disclosure is incorporated herein by reference for brevity.

Operation of Embodiment

Figure 7A:
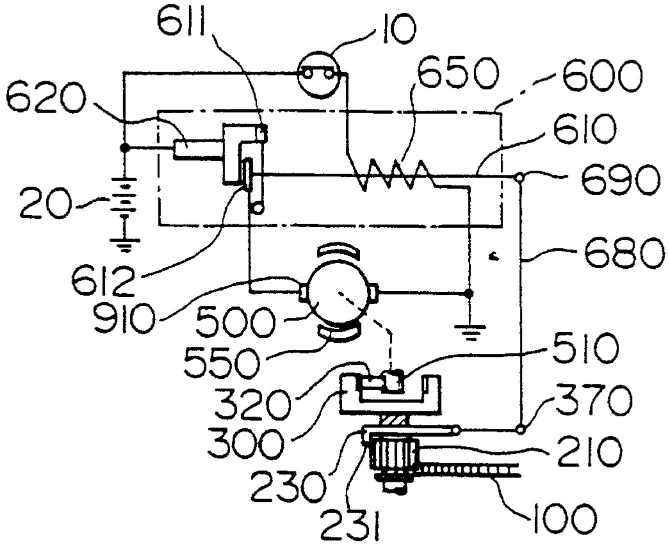
FIGS. 7A through 7C are electrical circuit diagrams indicating the operation of the embodiment.

Next, the operation of the above starter will be explained according to the electrical circuit diagrams shown in FIGS. 7A through 7C.

When a key switch 10 is set to a start position by an operator, the attraction coil 650 in the magnet switch 600 is energized by a battery 20. When attraction coil 650 is energized, the plunger 610 is attracted by the magnetic force generated by the attraction coil 650 so that it is lifted upward (leftward in FIG. 7A).

When plunger 610 starts to rise, the upper movable contact 612 and lower movable contact 611 also rise, and the rear end of the string-shaped member 680 also rises. When the rear end (ball) of the string-shaped member 680 rises, the forward end (ball 601 in FIG. 1) of the string-shaped member 680 is pulled downward through the pulley 690, and the pinion rotation restriction member 230 lowers. When the pinion rotation restriction member 230 lowers, and the restriction claw 231 engages with the notch 214 on the circumference of the flange 213 of the pinion gear 210, the lower movable contact 611 contacts the head 621 of the terminal bolt 620 (FIG. 7A). The voltage of the terminal bolt 620 is conveyed to the upper brush 910 via the lower movable contact 611, resistor 617, upper movable contact 612 and lead wire 910*a*. In other words, the low voltage conveyed with the resistor 617 is conveyed to the armature coil 530 via the upper brush 910. As the lower brush 910 is constantly grounded via the brush holding member 900, the armature coil 530 configured with upper coil pieces 531 and lower coil pieces 532 combined into a coil is energized with the low voltage. The armature coil 530 then generates a relatively weak magnetic force. This magnetic force acts on (attracts or repulses) the magnetic force of the fixed magnetic poles 550, causing the armature 540 to rotate at a relatively low speed.

When the armature shaft 510 rotates, the planetary gears 320 in the epicycle gear reduction mechanism 300 are rotated and driven by the sun gear 310 on the front end of the armature shaft 510. If the planetary gears 320 apply the rotary torque of the direction wherein the ring gear 100 is to be rotated and driven to the internal gear 340 via the planet carrier 330, the rotation of the internal gear 340 will be restricted by the function of the overrunning clutch. In other words, the internal gear 340 will not rotate, so the planet carrier 330 will decelerate and rotate due to the rotation of the planetary gear 320. If the planet carrier 330 rotates, the pinion gear 210 will also attempt to rotate, but as the rotation of the pinion gear 210 is restricted by the pinion rotation restriction member 230, the pinion gear 210 will advance axially along the helical spline 221 of the output shaft 220.

With the advance of the pinion gear 210, the pinion gear 210 will completely engage with the engine ring gear 100. When the pinion gear 210 advances, the restriction claw 231 will be disengaged from the notch 214 on the pinion gear 210, and then the restriction claw 231 will drop behind the washer 215 installed on the rear surface of the pinion gear 210.

Figure 7B:
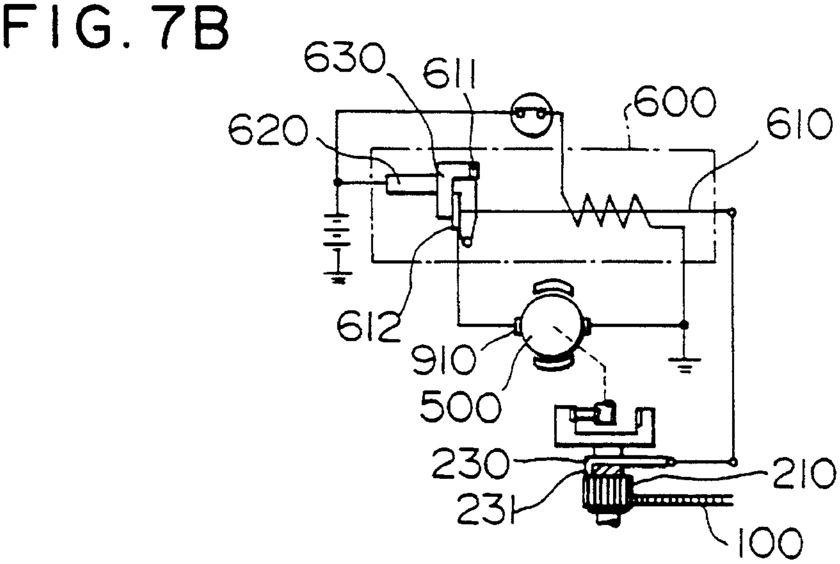

On the other hand, when the pinion gear 210 is advanced, the upper movable contact 612 will contact the contact portion 631 of the fixed contact 630 as shown in FIG. 7B. The battery voltage of the terminal bolt 620 will be directly conveyed to the upper brush 910 via the upper movable contact 612 and lead wire **910*a*. In other words, a high current will flow to the armature coil 530 configured of each upper coil piece 531 and each lower coil piece 532. The armature coil 530 will generate a large magnetic force, and will rotate the armature 540** at a high speed.

The rotation of the armature shaft 510 is decelerated by the epicycle gear reduction mechanism 300 thus increasing the rotational torque, and the planet carrier 330 will be rotated and driven. At this time, the front end of the pinion gear 210 will rotate together with the planet carrier 330. Pinion gear 210 is engaged with the engine ring gear 100, so pinion gear 210 will rotate and drive the ring gear 100 thereby rotating and driving the engine.

In this manner, when the clutch outer 351, or in other words, internal gear 340 runs idly, the conveyance of the engine drive force onto the sun gear 310 formed on the armature shaft 510 is stopped, thereby preventing the armature 540 from overrunning.

Next, when the engine starts and the engine ring gear 100 rotates faster than the pinion gear 210, a force to retract the pinion gear 210 will occur due to the function of the helical spline. The retraction of the pinion gear 210 will be prevented by the rotation restriction claw 231 that has dropped behind the pinion gear 210, and will prevent early separation of the pinion gear 210. Thus, the engine can be accurately started.

When the engine ring gear 100 rotates faster than the pinion gear 210 due to the starting of the engine, the pinion gear 210 will be rotated and driven by the rotation of the ring gear 100. The rotation torque conveyed to the pinion gear 210 from the ring gear 100 will be conveyed via the planet carrier 330 to the pins 332 that support the planetary gears 320. In other words, the planetary gears 320 are driven by the planet carrier 330. As a torque rotating in reverse of that when the motor is started will be applied on the internal gear 340, the overrunning clutch 350 will allow rotation of ring gear 100. In other words, when a torque rotating in reverse of that when the motor is started is applied on the internal gear 340, the rollers 353 of the overrunning clutch 340 will separate from the concave notch (not shown) on the clutch inner 352, and rotation of the internal gear 340 will be possible.

In other words, when the engine starts, the relative rotation wherein the engine ring gear 100 rotates and drives the pinion gear 210 will be absorbed by the overrunning clutch 350 and the armature 540 will not be rotated and driven by the engine.

Figure 7C:
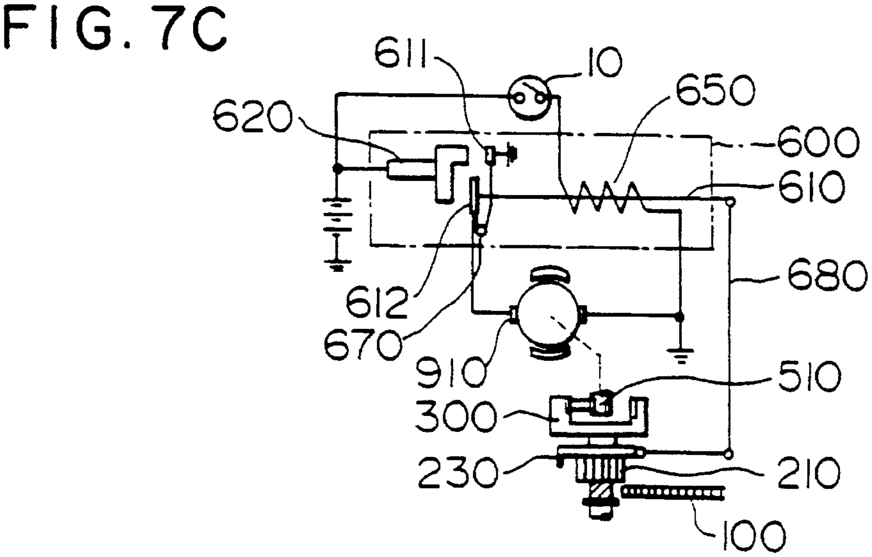

When the engine is started, the key switch 10 is removed from the start position by the operator, and the conductivity to the attraction coil 650 in the magnet switch 600 is stopped as shown in FIG. 7C. When the energizing to the attraction coil 650 is stopped, the plunger 610 will return downward due to the function of the compressed coil spring 660.

The upper movable contact 612 will be separated from the contact portion 631 of the fixed contact 630, and then the lower movable contact 611 will also be separated from the head portion 621 of the terminal bolt 620 causing the conductivity to the upper brush 910 to be stopped.

When the plunger 610 is returned downward, the pinion rotation restriction member 230 will return upward due to the function of a return spring (not shown) of the pinion rotation restriction member 230, and the restriction claw 231 will be separated from behind the pinion gear 210. The pinion gear 210 will be returned backward by the function of the return spring 240, and the engagement of the pinion gear 210 and engine ring gear 100 will be disengaged. At the same time, the rear end of the pinion gear 210 will contact the flange-shaped projection portion 222 on the output shaft 220. In other words, the pinion gear 210 is returned to the position before the starter started.

When the plunger 610 is returned downward, the lower movable contact 611 contacts the upper surface of the stationary core 642 on the magnet switch 600, and the lead wires **910*a* on the upper brush 910 are conducted in the order of upper movable contact 612, resistor 617, lower movable contact 611, stationary core 642, magnet switch cover 640 and brush holding member 900 all made of electrical conductive materials. In other words, the upper brush 910 and lower brush 901 are short circuited via brush holding material 900. On the other hand, an electromotive force is generated on the armature coil 530 by the coasting rotation of the armature 540. This electromotive force is short circuited via the upper brush 910, brush holding member 900 and lower brush 910, and thus a braking force is applied on the coasting rotation of the armature 540. As a result, the armature 540** stops instantly.

With the structure such as in this embodiment, each lead wire **910*a* of the brush 910 is directly connected to the upper movable contact 612, so the heat generated at the brush 910 is efficiently dissipated through the lead wire 910*a*, upper movable contact 612 and terminal bolt 620 and out the battery cable connected to the terminal bolt 620 and positioned outside the starter thereby improving the life of the brush 910**.

Furthermore, a permanent magnet is set as the field magnetic pole 550 in the yoke 501 of the motor 550. After the contact of the movable contact 612 and fixed contact 630 is released, the upper or positive pole brush 910 and the lower or negative pole brush 910 are short circuited, and an electromotive force is generated in the armature coil 530 by the permanent magnet's magnetic force when the motor 500 coasts and rotates. A braking force is then applied on the coasting rotation of the motor 500 thereby reducing the motor stopping time. Furthermore, the heat generated between the brush 910 and the coil end 534 functioning as a commutator can be suppressed, and even if the starting of the internal combustion engine fails, the starter can be started immediately and the impact when the ring gear and pinion gear reengage can be eased.

Furthermore, the brush 910 is set near the movable contact 534 so the connection portion of the brush 910 in the heat dissipation path can be shortened, and the heat efficiently dissipated from the battery cable thereby improving the life of the brush 910.

As the attraction coil 650, plunger 610, plunger shaft 615, upper movable contact 612 and fixed contact 630 connected with the end frame 700 are set in the end frame 700, the rod connected to the plunger and the lever connected to the rear of this rod with a snap ring, used in the prior art, can be eliminated, thereby reducing the number of parts. This also allows the distance between the brush 910 and upper movable contact 612 to be shortened, and prevents a conductivity defect between the brush 910 and upper movable contact 612 due to vibration from the engine.

By providing a starter having an epicycle gear reduction mechanism to decelerate and convey the rotation of the armature shaft 510 to the output shaft 220 having a pinion gear 210 that engages with the ring gear 100 of the internal combustion engine, the motor size can be reduced, and a high speed compact motor can be used. As the heat capacity is small, the heat generated between the coil ends as commutator 534 and brush 910 during motor rotation must be resolved. In accordance with the invention, the brush 910 heat can be efficiency dissipated from the battery cable and, thus, the effect is extremely large for the starter with epicycle gear reduction mechanism or, in other words, the starter in which the motor rotates at a high speed.

Engagement mechanism 230 is provided which engages the pinion gear 210 to the ring gear 100 of the internal combustion engine by sliding the pinion gear 210 set on the output shaft 220 with the attraction of plunger 610, so an optimum engagement can be realized. Furthermore, the starter size can be reduced.

What is claimed is:

1. A starter comprising a motor including a yoke having field means on the inner circumference thereof, an armature shaft, an armature core on which an armature coil is wound, and brush means slidable freely on a commutator that supplies a current to said armature coil;

a magnet switch including an attraction coil for generating a magnetomotive force when energized, a plunger attracted by the magnetomotive force of said attraction coil to drive a movable contact fixed thereto, and a fixed contact facing said movable contact and fixedly connected with a battery; and connection means fixedly connected to said movable contact at one end thereof and directly to a connection portion of said brush means at the other end thereof and feeding power to said commutator via said brush means.

2. The starter according to claim 1, wherein said field means has a permanent magnet set in said yoke as a field magnetic pole, wherein said brush means comprises a positive pole brush and a negative pole brush, and wherein said positive pole brush is short circuited with said negative pole brush when contact of said movable contact and said fixed contact is released.

3. The starter according to claim 1, wherein said brush means is set near said movable contact.

4. The starter according to claim 1, further comprising a tubular-shaped end frame with base to cover one axial end of said yoke of said motor, said end frame encasing therein said attraction coil, said plunger, said movable contact and said fixed contact.

5. The starter according to claim 1, further comprising:

an output shaft having thereon a pinion gear engageable with a ring gear of internal combustion engine; and a speed reduction mechanism for conveying rotation of said armature shaft to said output shaft in a reduced rotation speed.

6. The starter according to claim 5, further comprising:

fitting means to slide said pinion gear via said output shaft by attraction of said plunger to fit said pinion gear with said ring gear of said internal combustion engine.

7. A starter comprising an electric motor having a commutator means and brush means slidable on said commutator means;

a magnet switch having coil means, plunger means driven by said coil means, and movable contact means fixedly coupled with said plunger means to be connected to a fixed contact connected to a battery when said plunger means is driven, said plunger means being positioned close to said brush means;

lead wire means electrically connecting said brush means to said movable contact means only therethrough irrespective of a position of said movable contact means and transferring heat generated in said brush means to said movable contact means; and an output shaft movingly supporting thereon a pinion engageable with an engine and rotated by said electric motor.

8. A starter according to claim 7 further comprising:

a brush holding member positioned between said motor and said magnet switch and holding said brush means therethrough.

9. A starter according to claim 8, wherein said brush means includes a positive brush connected to said movable contact through said lead wire means and a negative brush in direct contact with said brush holding member, wherein said brush holding member is made of metal, and wherein said positive brush and negative brush are short circuited when said coil means is deenergized.

10. A starter according to claim 7, wherein said lead wire means has one end fixed to said brush means and the other end fixed to said movable contact means.

11. A starter according to claim 10, further comprising:

an end frame made of electrically insulating material encasing said magnet switch therein; and a terminal bolt fixedly supported by said end frame and connectable to a battery, said terminal bolt being fixedly connected with said fixed contact at an inside of said end frame.

* * * * *